(12) United States Patent
Hente et al.

(10) Patent No.: US 9,173,268 B2
(45) Date of Patent: Oct. 27, 2015

(54) CURRENT DETERMINATION APPARATUS

(75) Inventors: Dirk Hente, Wuerselen (DE); Joseph Hendrik Anna Maria Jacobs, Eygelshoven (NL); Céline Catherine Sarah Nicole, Eindhoven (NL); Christian Kalkschmidt, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/234,509

(22) PCT Filed: Jul. 12, 2012

(86) PCT No.: PCT/IB2012/053558
§ 371 (c)(1),
(2), (4) Date: Jan. 23, 2014

(87) PCT Pub. No.: WO2013/014568
PCT Pub. Date: Jan. 31, 2013

(65) Prior Publication Data
US 2014/0176012 A1    Jun. 26, 2014

Related U.S. Application Data

(60) Provisional application No. 61/511,610, filed on Jul. 26, 2011.

(51) Int. Cl.
*H05B 37/02*    (2006.01)
*H05B 33/08*    (2006.01)

(52) U.S. Cl.
CPC .......... *H05B 33/0866* (2013.01); *H05B 33/086* (2013.01); *H05B 33/0896* (2013.01)

(58) Field of Classification Search
CPC .......... H05B 33/0869; H05B 33/0896; H05B 33/0818; H05B 33/086
USPC .................. 315/291, 294, 307, 312, 318, 297; 345/83, 82, 204, 690
See application file for complete search history.

(56) References Cited

U.S. PATENT DOCUMENTS

| 6,967,447 B2 * | 11/2005 | Lim et al. ....................... 315/291 |
| 8,013,533 B2 * | 9/2011 | De Rijck et al. ............... 315/149 |
| 9,041,316 B2 * | 5/2015 | Pi et al. .......................... 315/312 |

(Continued)

FOREIGN PATENT DOCUMENTS

| EP | 2273851 A2 | 1/2011 |
| WO | 2007069149 A1 | 6/2007 |

(Continued)

*Primary Examiner* — Haissa Philogene
(74) *Attorney, Agent, or Firm* — Yuliya Mathis (57) ABSTRACT

The invention relates to a current determination apparatus for determining an operational driving current for driving a light source of a group of light sources. A same color shift function defining a light color shift depending on a driving current can be provided for all light sources of the group. An operational driving current is determined based on the color shift function such that the light color (43) of the light source of the group of light sources is shifted from a nominal color, which may be specific for each light source, to a light color (45) within a target color window (41). Since for the different light sources the same color shift function can be used, a determination of individual operational driving currents such that the light sources of the group emit light having substantially the same color can be simplified.

15 Claims, 5 Drawing Sheets

(56) References Cited

U.S. PATENT DOCUMENTS

| | | |
|---|---|---|
| 2006/0114201 A1* | 6/2006 | Chang .............................. 345/83 |
| 2010/0118057 A1 | 5/2010 | Atkins et al. |
| 2011/0080442 A1 | 4/2011 | Ghosh et al. |
| 2014/0354183 A1* | 12/2014 | Hente et al. ................... 315/307 |

FOREIGN PATENT DOCUMENTS

| | | |
|---|---|---|
| WO | 2008056321 A1 | 5/2008 |
| WO | 2010046811 A1 | 4/2010 |
| WO | 2010150119 A2 | 12/2010 |

* cited by examiner

CURRENT DETERMINATION APPARATUS

FIELD OF THE INVENTION

The invention relates to a current determination apparatus, a current determination method and a current determination computer program for determining an operational driving current for driving a light source of a group of light sources. The invention relates further to a lighting apparatus comprising the group of light sources and the current determination apparatus.

BACKGROUND OF THE INVENTION

WO 2010/046811 A1 discloses an apparatus and a method for improving the uniformity of at least one optical property of a tiled organic light emitting diode (OLED) lighting source comprising at least two OLED tiles. Electrical power is applied to the OLED tiles with a power providing means, wherein the power providing means comprises a control means adapted for controlling the electrical power to each of the OLED tiles. At least one optical property of each of the OLED tiles is measured as a function of their respective electrical power to determine at least one electro-optical property of each OLED tile. The control means is modified by using the electro-optical properties for compensating the effect of a variation of the electro-optical properties on the uniformity of the optical properties of the OLED tiles.

SUMMARY OF THE INVENTION

It is an object of the present invention to provide a current determination apparatus, a current determination method and a current determination computer program for determining an operational driving current for driving a light source of a group of light sources, wherein the determination of a driving current for driving the light source and, thus, a corresponding control of the light source such that the group of light sources emits light having substantially the same color can be simplified.

In a first aspect of the present invention a current determination apparatus for determining an operational driving current for driving a light source of a group of light sources is presented, wherein the light sources are adapted to change a color of light emitted by the light sources depending on a change of a driving current used for driving the respective light source, wherein the current determination apparatus comprises:
  a light characteristic shift function providing unit for providing a color shift function defining a shift of the color of light emitted by a light source of the group of light sources depending on the driving current of the light source, the color shift function being the same for all light sources of the group,
  a target window providing unit for providing a target color window,
  a nominal light characteristic providing unit for providing a nominal color of the light emitted by a light source of the group of light sources, if the light source is driven by a nominal driving current,
  a current determination unit for determining an operational driving current based on the color shift function, the target color window and the nominal color such that the color of the light emitted by the light source of the group of light sources is shifted from the nominal color to a color within the target color window.

Since the light characteristic shift function providing unit provides a color shift function defining a shift of the color of light emitted by a light source of the group of light sources depending on the driving current of the light source, wherein the provided color shift function is the same for all light sources of the group, a single color shift function can be used for determining the operational driving currents for different light sources of the group of light sources. It is therefore not necessary to provide for each light source of the group of light sources a respective color shift function. Moreover, the single color shift function for the different light sources of the group of light sources can be determined at the production site, at which the group of light sources is produced, wherein in use the group of light sources can be controlled based on operational driving currents, which have been determined based on the single color shift function, without necessarily requiring, for example, a photodetector for detecting the color of the light emitted by the light sources and for controlling the light sources depending on the detected color. The determination of the operational driving currents for driving the light sources such that the light sources emit light having substantially the same color can therefore be simplified.

The light characteristic shift function providing unit is preferentially a storing unit, in which the light characteristic shift function is stored already. The light characteristic shift function can be determined at the production site by measuring the color of a light source of the group of light sources depending on the driving current.

Also the target window providing unit is preferentially a storing unit, in which the target color window is stored already. The target color window can be predefined and stored in the target window providing unit at the production site, and/or, after the current determination apparatus has been produced, can be set by a user. In the latter case, the target window providing unit can comprise input means like a keyboard and optionally a display, which allow a user to set a desired target color window.

The nominal light characteristic providing unit is preferentially also a storing unit in which the nominal color of the light emitted by the respective light source of the group of light sources, if the light source is driven by the nominal driving current, is stored already. The nominal color can have been determined and stored in the nominal light characteristic providing unit at the production site, before delivering the current determination apparatus, in particular, before delivering a lighting apparatus comprising the current determination apparatus, to a user. The nominal color can be different for different light sources of the group of light sources. Thus, preferentially for each light source of the group of light sources an individual nominal color is provided by the nominal light characteristic providing unit, whereas the same color shift function, i.e. a single color shift function, is provided for all light sources of the group of light sources by the light characteristic shift function providing unit. The current determination unit determines then for each light source of the group of light sources an individual operational driving current based on the single color shift function, the single target color window, which is also the same for the different light sources of the group of light sources, and the nominal color, which may be different for different light sources of the group of light sources, such that the color of the light of each light source of the group of light sources is shifted from the respective nominal color to a color within the target color window.

The target color window can define a target range having more than one target color value or the target color window can define a single target color value.

The color shift function can be an analytical function or it can be formed of discrete values defining the respective shifts of the color of the light depending on the driving current.

The color can be represented as a color point in a color coordinate system like a color point in a CIE color space.

The nominal current is preferentially a direct current (DC). The color shift function defines preferentially the shift of the nominal color of the light, which is emitted, if the light source is driven by the nominal DC current, to another color of the light, which is emitted, if the light source is driven by the operational driving current.

In an embodiment, the current determination unit is adapted to determine a modulated current having a current shape as the operational driving current, the light characteristic shift function providing unit is adapted to provide a color shift function defining the color shift depending on the current shape, and the current determination unit is adapted to determine a current shape of the operational driving current based on the color shift function, the target color window and the nominal color such that the color of the light emitted by the light source is within the target color window. The current shape can be characterized by one or several shape parameters and, thus, the color shift function can be adapted to define the color shift depending on at least one of the one or several shape parameters. Correspondingly, the current determination unit can be adapted to determine at least one of one or several shape parameters, which define the current shape of the operational driving current, based on the color shift function, the target color window and the nominal color such that the color of the light emitted by the light source is within the target color window.

For instance, the current determination unit can be adapted to determine a modulated current as the operational driving current, wherein the light characteristic shift function providing unit can be adapted to provide a color shift function defining the color shift depending on an amplitude of the operational driving current, which may be regarded as being a shape parameter of the operational driving current, and wherein the current determination unit can be adapted to determine an amplitude of the operational driving current based on the color shift function, the target color window and the nominal color such that the color of the light emitted by the light source is within the target color window. The light characteristic shift function providing unit can also be adapted to provide a color shift function defining the color shift depending on an amplitude and a pulse width of the operational driving current, which may both be regarded as being shape parameters of the operational driving current, and the current determination unit can be adapted to determine an amplitude and a pulse width of the operational driving current based on the color shift function, the target color window and the nominal color such that the color of the light emitted by the light source is within the target color window. This allows shifting the colors of the individual light sources in a relatively simple way by modifying the amplitude and optionally the pulse width of the modulated current.

The modulated current is preferentially a square-wave current.

It is further preferred that the current determination unit is adapted to determine the pulse width such that the average operational driving current is within a provided target average driving current window. The target average driving current window can define a single target value or a range of target values. In an embodiment, the target average driving current window is or contains the current value of the nominal DC current. If the average operational driving current is within a provided target average driving current window, the luminance can be substantially constant, although the amplitude of the driving current is modified.

In an embodiment, the light characteristic shift function providing unit is adapted to provide a luminance shift function defining a shift of the luminance of light emitted by a light source of the group of light sources depending on the driving current of the light source, the luminance shift function being the same for all light sources of the group, the target window providing unit is adapted to provide a target luminance window, the nominal light characteristic providing unit is adapted to provide a nominal luminance of the light emitted by the light source, if the light source is driven by a nominal driving current, and the current determination unit is adapted to determine an operational driving current based on the color shift function, the luminance shift function, the target color window, the target luminance window, the nominal color and the nominal luminance such that the color of the light emitted by the light source is shifted from the nominal color to a color within the target color window and such that the luminance of the light source is shifted from the nominal luminance to a luminance within the target luminance window. Since the current determination unit determines the operational driving current not only such that the shifted color is within the target color window, but also such that the shifted luminance is located within the target luminance window, the light sources of the group of light sources can be controlled such that each light source emits light having substantially the same color and substantially the same luminance. Moreover, since the luminance shift function is the same for all light sources of the group, i.e. since a single luminance shift function can be used for all light sources of the group, the operation driving currents for driving the light sources can be determined such that the luminance of the light emitted by the light sources is substantially the same in a relatively simple way.

The target luminance window can define a target range having more than one target luminance value or the target luminance window can define a single target luminance value.

The current determination unit can be adapted to determine a modulated current as the operational driving current, wherein the light characteristic shift function providing unit can be adapted to provide a luminance shift function defining the luminance shift depending on a pulse width of the operational driving current, and wherein the current determination unit can be adapted to determine a pulse width of the operational driving current based on the luminance shift function, the target luminance window and the nominal luminance such that the luminance of the light emitted by the light source is within the target luminance window. In particular, the light characteristic shift function providing unit is adapted to provide a luminance shift function defining the luminance shift depending on an amplitude and a pulse width of the operational driving current, and the current determination unit is adapted to determine an amplitude and a pulse width of the operational driving current based on the luminance shift function, the target luminance window and the nominal luminance such that the luminance of the light emitted by the light source is within the target luminance window. This allows shifting the luminance of the respective light source of the group of light sources in a relatively simple way by modifying the pulse width and optionally the amplitude of the individual driving current driving the respective light source.

It should be noted that, if the operational driving current is modulated, the modulation is performed with a frequency being too high for a human eye to follow. The resulting color and luminance are therefore an average color and an average luminance, respectively, wherein the color shift function and luminance shift function refer to the average color and the average luminance perceptible by a human being.

Preferentially, the group of light sources comprises light sources having at least one of the same architecture, the same form and the same size. In particular, the light sources of the same group all have the same architecture, the same form and the same size.

The same architecture preferentially refers to the same material comprised by the light source. In addition or alternatively, the same architecture preferentially indicates that the processing parameters, which have been used for producing the light sources, are the same.

The operational driving current is preferentially a modulated current, wherein the color shift function depends linearly on an amplitude of the driving current. This allows providing the color shift function in a very simple way by just providing the corresponding analytical linear function.

In an embodiment, edges of a window can be regarded as being a part of the window. If a color is shifted onto an edge of the target color window, the color can be regarded as having been shifted within the target color window. In particular, the current determination unit can be adapted to determine the operational driving current such that the color of the light source is located on or close to an edge of the target color window. The edge of the target color window can also be regarded as being a border of the target color window. The target color window can have any desired shape. For instance, the target color window can be circular, ellipsoidal or rectangular, in particular, quadratic. In an embodiment, the target window providing unit can be adapted to provide a target color window having at least two edges, and the current determination unit can be adapted to determine for each of the edges of the target color window a driving current such that the color is shifted onto or close to the respective edge of the target color window and to determine the smallest of the determined driving currents as the operational driving current.

It has been found that generally a larger current, in particular, a larger current amplitude, is needed for providing a larger color shift. By determining the operational driving current such that the shifted color is not located, for example, in the center of the target color window, but on or close to the edge of the target color window, a smallest operational driving current can be determined for each light source of the group of light sources, which shifts the respective color to a location within the target color window. This allows reducing electrical heat losses.

The current determination apparatus preferentially further comprises a control unit for controlling the light source of the group of light sources in accordance with the determined operational driving current. The control unit can be a part of the current determination apparatus such that the current determination apparatus may be regarded as being a control apparatus. The current determination apparatus can also be a separate device, which may be used at the production site only for determining the operational driving currents, wherein current data representing the determined operational driving currents, in particular, the determined operational driving currents themselves and/or control signals for controlling one or several driving units for driving the light sources in accordance with the determined operational driving currents, can be stored in the control unit.

Thus, the control unit can be adapted to directly provide the operational current, which can be applied to the respective light source, or the control unit can be adapted to generate control signals, which can be provided to a driving unit for generating the operational current, which is applied to the respective light source. In particular, the control unit can be adapted to generate control signals for being provided to a driving unit for driving the respective light source of the group light sources, wherein the control signals are generated based on the determined operational driving current, wherein the control unit and the driving unit are adapted such that the generated control signals cause the driving unit to apply the determined operational driving current to the at least one light source. Dependencies between a desired operational driving current, in particular, a desired amplitude and pulse width of an operational driving current, and control signals, which can be input into the respective driving unit for allowing the driving unit to apply the desired operational driving current to the respective light source, can be stored in the control unit or in another storing unit, wherein the control unit can be adapted to generate the control signals depending on the determined operational driving current, which should be applied to the respective light source, and the stored dependencies between control signals and operational driving currents.

The light sources are preferentially light emitting diodes, in particular, OLEDs.

In a further aspect of the present invention a lighting apparatus is presented, wherein the lighting apparatus comprises a group of light sources, the light sources being adapted to change a color of light emitted by the light sources depending on a change of a driving current used for driving the light sources, and the current determination apparatus for determining operational driving currents for driving the group of light sources.

In a further aspect of the present invention a current determination method for determining an operational driving current for driving a light source of a group of light sources is presented, wherein the light sources are adapted to change a color of light emitted by the light sources depending on a change of a driving current used for driving the light sources, the current determination method comprises:
    providing a color shift function defining a shift of the color of light emitted by a light source of the group of light sources depending on the driving current of the light source by a light characteristic shift function providing unit, the color shift function being the same for all light sources of the group,
    providing a target color window by a target window providing unit,
    providing a nominal color of the light emitted by a light source of the group of light sources, if the light source is driven by a nominal driving current, by a nominal light characteristic providing unit,
    determining an operational driving current based on the color shift function, the target color window and the nominal color such that the color of the light emitted by the light source of the group of light sources is shifted from the nominal color to a color within the target color window by a current determination unit.

The current determination method preferentially further comprises the step of controlling the light source of the group of light sources in accordance with the determined operational driving current by a control unit.

In a further aspect of the present invention a current determination computer program for determining an operational driving current for driving a light source of a group of light sources is presented, wherein the light sources are adapted to change a color of light emitted by the light sources depending on a change of a driving current used for driving the light sources, the current determination computer program comprising program code means for causing an current determination apparatus as defined in claim 1 to carry out the steps of the current determination method as defined in claim 14, when the current determination computer program is run on a computer controlling the current determination apparatus.

It shall be understood that the current determination apparatus of claim 1, the lighting apparatus of claim 13, the current determination method of claim 14 and the current determination computer program of claims 15 have similar and/or identical preferred embodiments as defined in the dependent claims.

It shall be understood that a preferred embodiment of the invention can also be any combination of the dependent claims with the respective independent claim.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
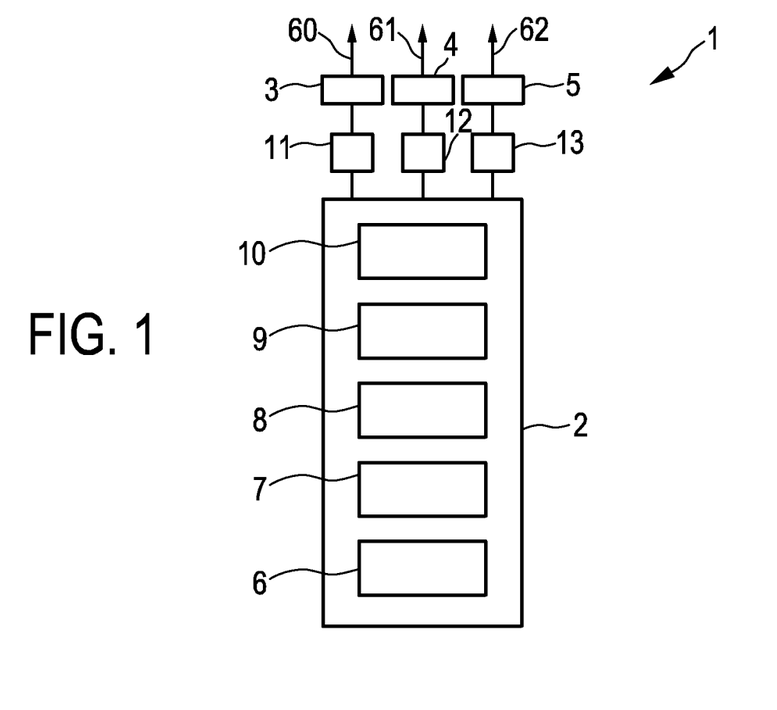
FIG. 1 shows schematically and exemplarily an embodiment of a lighting apparatus comprising a group of light sources.

FIG. 1 shows schematically and exemplarily an embodiment of a lighting apparatus. The lighting apparatus 1 comprises a group of light sources 3, 4, 5 being, in this embodiment, OLEDs. Each light source 3, 4, 5 changes the color of the light 60, 61, 62 emitted by the respective light source 3, 4, 5 depending on a change of a driving current used for driving the respective light source 3, 4, 5. The driving current for the respective light source 3, 4, 5 is provided by a respective driving unit 11, 12, 13. The group of light sources 3, 4, 5 is controlled by a current determination apparatus 2 via the driving units 11, 12, 13.

The current determination apparatus 2 comprises a light characteristic shift function providing unit 6 for providing a color shift function defining a shift of the color of light emitted by a light source of the group of light sources 3, 4, 5 depending on the driving current of the respective light source. The provided color shift function is the same for all light sources 3, 4, 5 of the group. The color shift function can be determined, for example, at the production site by measuring the color point of the light emitted by a light source of the group of light sources depending on the driving current. Preferentially, the color shift function defines the shift between a nominal color, which is present when the respective light source is driven by a nominal driving current, and a color, which is present when the light source is driven by another driving current. The nominal driving current is preferentially a nominal DC current and the other driving current is preferentially a modulated current, i.e., in this embodiment, a square-wave current. The color shift function can therefore be measured, in particular, at the production site, by measuring the color shifts from the nominal color to the different other colors, while different modulated driving currents are applied to a light source.

The color shift function can be an analytical function, which can be determined by fitting an analytical function to the measured color shifts and the corresponding driving currents, or the color shift function can be formed of discrete values defining the respective color shifts depending on the driving current as measured. The color shift function can be measured at the production site and then stored in the light characteristic shift function providing unit 6, i.e. the light characteristic shift function providing unit 6 can be a storing unit, in which the color shift function is stored already.

The color is preferentially represented as a color point in a color coordinate system like a color point in a CIE color space.

The current determination apparatus further comprises a target window providing unit 7 for providing a target color window and a nominal light characteristic providing unit 8 for providing a nominal color of the light emitted by a light source of the group of light sources, if the light source is driven by a nominal driving current. Also the target window providing unit 7 and the nominal light characteristic providing unit 8 are preferentially storing units, in which the target color window and the nominal color, respectively, are stored already. However, the target window providing unit 7 can also be adapted to allow a person to set a desired target color window.

The nominal color is preferentially measured at the production site and then stored in the nominal light characteristic providing unit 8. In an embodiment, the nominal light characteristic providing unit also comprises a receiving unit for receiving the nominal color from a light source of the group of light sources, wherein the nominal color is stored in the respective light source. If a new light source is added to the group of light sources or if a light source is replaced by another light source, the new light source can send its nominal color to the nominal light characteristic providing unit for allowing the nominal light characteristic providing unit to provide the same.

The current determination apparatus further comprises a current determination unit 9 for determining an operational driving current based on the color shift function, the target color window and the nominal color such that the color of the light emitted by the light source of the group of light sources 3, 4, 5 is shifted from the nominal color to a color within the target color window. The current determination apparatus 2 further comprises a control unit 10 for controlling the light source of the group of light sources 3, 4, 5 in accordance with the determined operational driving current. Thus, for each light source 3, 4, 5 an individual operational driving current is determined such that the light of each light source 3, 4, 5 is within the target color window, wherein the determination of the different individual operational driving currents is based on the same color shift function. In particular, the control unit 10 generates control signals for each light source 3, 4, 5, wherein the control signals are provided to the corresponding driving units 11, 12, 13 for generating the respective operational driving current, which is applied to the respective light source 3, 4, 5. The control signals are generated based on the determined individual operational driving currents, wherein the control unit 10 and the driving units 11, 12, 13 are adapted such that the generated control signals cause the driving units 11, 12, 13 to apply the determined individual operational driving currents to the respective light sources 3, 4, 5.

In this embodiment, the target color window defines a target range having more than one target color point. However, in another embodiment the target color window can also define a single target color point.

The light characteristic shift function providing unit 6 can be adapted to provide a color shift function defining the color shift depending on an amplitude of the operational driving current. The current determination unit can then be adapted to determine an amplitude of the operational driving current based on the color shift function, the target color window and the nominal color such that the color of the light emitted by the respective light source is within the target color window. Moreover, the light characteristic shift function providing unit 6 can also be adapted to provide a color shift function defining the color shift depending on the amplitude and the pulse width of the operational driving current, and the current determination unit 9 can be adapted to determine an amplitude and a pulse width of the operational driving current based on the color shift function, the target color window and the nominal color such that the color of the light emitted by the respective light source 3, 4, 5 is within the target color window. Or, the light characteristic shift function providing unit 6 can be adapted to provide a color shift function defining the color shift depending on the amplitude of the operational driving current and the current determination unit 9 can be adapted to determine a) an amplitude of the operational driving current based on the color shift function, the target color window and the nominal color such that the color of the light emitted by the respective light source 3, 4, 5 is within the target color window, and b) a pulse width such that the average of the operational driving current is within a provided target average driving current window. The target average driving current window can be predefined and stored, for example, in the target window providing unit 7. Preferentially, the target average driving current window is or contains the current value of the nominal DC current.

In an embodiment, the light characteristic shift function providing unit 6 is further adapted to provide a luminance shift function defining a shift of the luminance of light emitted by a light source of the group of light sources 3, 4, 5 depending on the driving current of the light source, wherein the luminance shift function is the same for all light sources 3, 4, 5 of the group. In this case, the target window providing unit 7 is adapted to provide a target luminance window, the nominal light characteristic providing unit 8 is adapted to provide a nominal luminance of the light emitted by the respective light source 3, 4, 5, if the respective light source 3, 4, 5 is driven by a nominal driving current, and the current determination unit 9 is adapted to determine an operational driving current based on the color shift function, the luminance shift function, the target color window, the target luminance window, the nominal color and the nominal luminance such that the color of the light emitted by the light source is shifted from the nominal color to a color within the target color window and such that the luminance of the light source is shifted from the nominal luminance to a luminance within the target luminance window. The light characteristic shift function providing unit 6 can be adapted to provide a luminance shift function defining the luminance shift depending on a pulse width of the operational driving current, and the current determination unit 9 can be adapted to determine a pulse width of the operational driving current based on the luminance shift function, the target luminance window and the nominal luminance such that the luminance of the light emitted by the respective light source 3, 4, 5 is within the target luminance window. However, the light characteristic shift function providing unit 6 can also be adapted to provide a luminance shift function defining the luminance shift depending on the amplitude and the pulse width of the operational driving current, and the current determination unit 9 can be adapted to determine an amplitude and a pulse width of the operational driving current based on the luminance shift function, the target luminance window and the nominal luminance such that the luminance of the light emitted by the respective light source 3, 4, 5 is within the target luminance window. The luminance shift function depending on the pulse width and optionally further depending on the amplitude of the driving current can be determined by corresponding measurements, in particular, at the production site, whereby the luminance shift with respect to the nominal luminance present, when the nominal driving current is applied, is measured, while different driving currents having different pulse widths and optionally different amplitudes are applied to a light source of the group of light sources.

In an embodiment, a color shift function is provided, which defines the color shift depending on the amplitude and the pulse width of the operational driving current, and a luminance shift function is provided, which defines the luminance shift depending on the amplitude and the pulse width of the operational driving current. In this case, the current determination unit 9 can be adapted to determine an amplitude and a pulse width of the operational driving current based on the color shift function, the luminance shift function, the target color window, the target luminance window, the nominal color and the nominal luminance such that the color of the light emitted by the respective light source 3, 4, 5 is shifted from the nominal color to a color within the target color window and such that the luminance of the respective light source 3, 4, 5 is shifted from the nominal luminance to a luminance within the target luminance window.

The operational driving current is modulated with a frequency being too high for a human eye to follow. The colors and luminances, to which the corresponding shift functions, the corresponding target windows and the current determination unit refer, are therefore average colors and average luminances, respectively.

The group of light sources 3, 4, 5 is of the same type, i.e. the light sources 3, 4, 5 have at least one of the same architecture, the same form and the same size.

In an embodiment, the color shift function can dependent linearly on the amplitude and/or linearly on the pulse width. Also the optional luminance shift function can depend linearly on an amplitude and/or linearly on a pulse width of the driving current. If the respective shift function has a linear dependence, it is preferentially stored in the light characteristic shift function providing unit as a corresponding linear analytic function.

Figure 2:
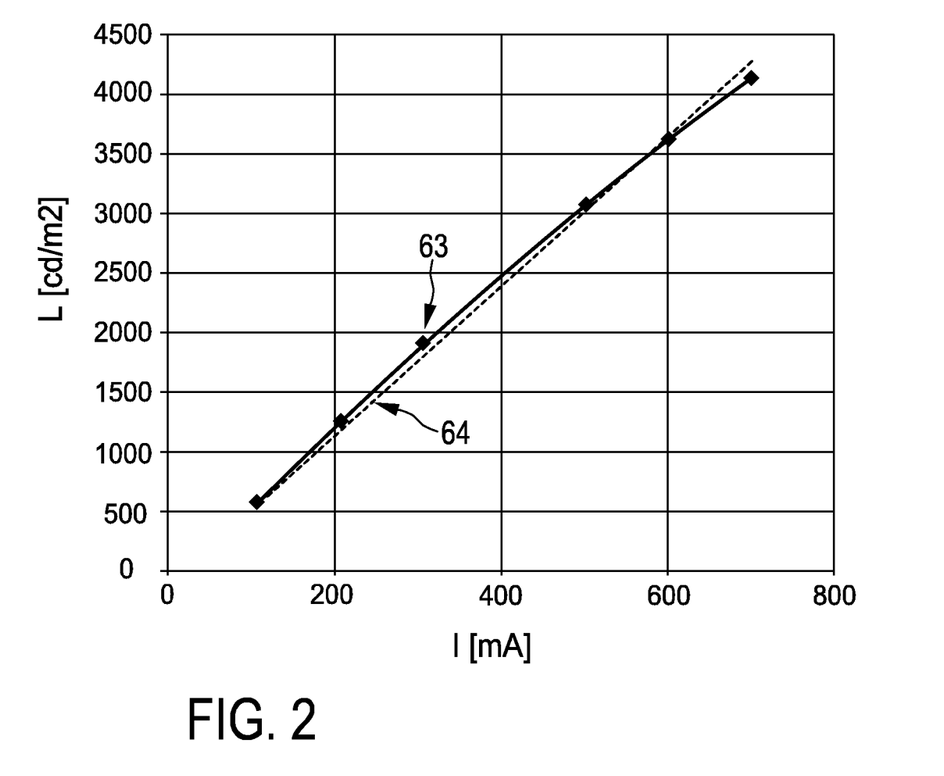
FIG. 2 shows exemplarily a dependence of the luminance of an OLED on a DC driving current applied to the OLED.

FIG. 2 shows exemplarily a dependence of the luminance L of an OLED on a DC current I applied to the OLED. Squares 63 and lines connecting the squares 63 are shown for indicating measured values and a straight line 64 is shown for indicating a linear approximation. In an embodiment, the luminance shift function can be regarded as being the deviation of the dependence shown in FIG. 2 and as being dependent on the average of the modulated operational driving current and, thus, if the amplitude is held constant for not modifying the color, which may already have been shifted into the target color window, as being dependent on the pulse width. In an embodiment, the luminance shift function can therefore be substantially constant with changing the average of the modulated operational driving current and, accordingly, with changing the pulse width, wherein it is assumed that, with respect to changes of the luminance of the OLED, the average of the operational driving current corresponds to the DC current I. Thus, if, in an embodiment, the amplitude of the modulated operational driving current has already been determined by using a color shift function, which depends on the amplitude of the operational driving current, during shifting the luminance into the target luminance window the amplitude may remain constant, in order to substantially not modify the color again, such that the average of the modulated operational driving current is determined by the pulse width of the operational driving current and, accordingly, the luminance shift function can be regarded as being dependent on the pulse width of the modulated operational driving current.

Edges of a target window can be regarded as being a part of the target window. If a color and/or luminance are shifted onto an edge of the corresponding target window, the color and/or luminance can be regarded as having been shifted into the respective target window. The current determination unit 9 can therefore be adapted to determine the operational driving current such that the color and optionally also the luminance of each light source 3, 4, 5 is located on or close to an edge of the respective target window. A color and/or luminance are located close to an edge of the respective target window, if the color and/or luminance are located, for example, adjacent to the respective edge. In an embodiment, the target color window has at least two edges, wherein the current determination unit 9 is adapted to determine for each of the edges of the target color window a driving current such that the color is shifted onto or close to the respective edge of the target color window and to determine the smallest of the determined driving currents as the operational driving current.

Figure 3:
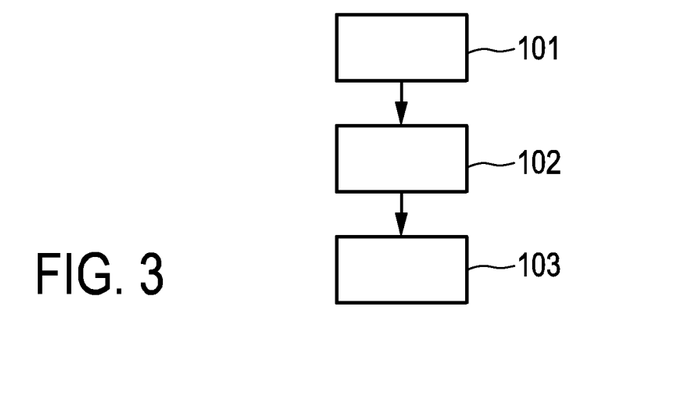
FIG. 3 shows a flowchart exemplarily illustrating an embodiment of a current determination method for determining operational driving currents for driving the group of light sources.

In the following an embodiment of a current determination method for determining an operational driving current for driving a light source of a group of light sources will exemplarily be described with reference to a flowchart shown in FIG. 3.

In step 101, a color shift function defining a shift of the color of light emitted by a light source of the group of light sources 3, 4, 5 depending on the driving current of the respective light source is provided by the light characteristic shift function providing unit 6, wherein the color shift function is the same for all light sources 3, 4, 5 of the group. Moreover, in step 101 a target color window is provided by the target window providing unit 8, and a nominal color of the light emitted by the respective light source 3, 4, 5 of the group of light sources, if the light source is driven by a nominal driving current, is provided by the nominal light characteristic providing unit 8.

In step 102, an operational driving current is determined based on the color shift function, the target color window and the nominal color such that the color of the light emitted by the respective light source 3, 4, 5 of the group of light sources is shifted from the nominal color to a color within the target color window by the current determination unit 9.

Steps 101 and 102 are performed for each light source, of which the nominal color is not within the target color window, wherein for each light source the same color shift function, the same target color window and the respective individual nominal color are used.

In step 103, each light source 3, 4, 5 of the group of light sources is individually controlled in accordance with the determined individual operational driving current by the control unit 10 via the driving units 11, 12, 13.

Although in the above described embodiments the lighting apparatus 1 comprises three OLEDs only, the lighting apparatus can comprise more or less than three OLEDs. In particular, the lighting apparatus can be a large area OLED lighting device for general illumination made of a plurality of OLED units of smaller sizes, i.e. also known as OLED tiles, which are arranged in a matrix form. The use of these OLED tiles has several advantages over a single monolithic large area OLED lamp device. The production yield can be increased significantly. The power loss can be reduced by series connection. The fault tolerance of the lighting apparatus can be increased. And, the geometric appearance can be easily customized, for example, the OLED lighting apparatus can have the form of strips or of squares having different aspect ratios, or other forms.

While this OLED tiling has several advantages over single large area tiles, OLED tiling has the disadvantage of varying properties of the individual tiles. Due to manufacturing tolerances variations of the emitted light spectrum are typical even for OLEDs of the same production batch.

The above described current determination apparatus allows compensating for color and optionally also for luminance variations of the individual OLEDs without the necessity of time consuming calibration procedures. Moreover, the compensation can be self-adaptive and scalable. The above described current determination apparatus can lead to an electronic yield improvement, because it increases number of production samples that meet color point and optionally luminance requirements.

Since the color shift function and the luminance shift function are known already, in use the color shift and the luminance shift can be calculated without necessarily requiring a calibration procedure.

For a production batch the color shift function and the luminance function are the same as long as the OLEDs have the same device architecture, form and size. The same architecture refers to the same material of the stack, which forms the OLED, like, for example, materials for electron injection, light emission, hole injection and electrodes. In addition, the same architecture preferentially indicates that the processing parameters, which have been used for producing the OLEDs, are the same.

Figure 4:
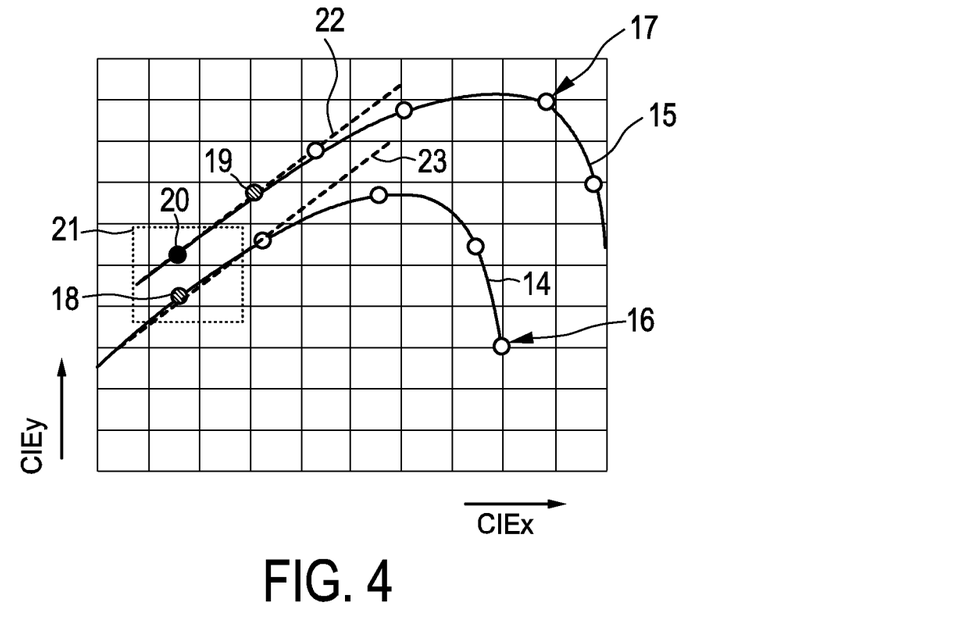
FIG. 4 shows schematically and exemplarily different color points for different operational driving currents applied to different OLEDs.

FIG. 4 shows exemplarily color points of two OLEDs in a CIE color coordinate system, i.e. in a CIE color space. The curve 15 and the circles 17, 19 and 20 indicate different color points for different driving currents for the first OLED and the line 14 and the circles 16 and 18 indicate different color points for different driving currents for a second OLED. If the OLEDs are driven by the nominal driving current, the color point 18 of the second OLED is within a target color window 21, but the color point 19 of the first OLED is not within the target color window 21. However, if another driving current is applied to the first OLED, also the first OLED may emit light having a color point 20 within the target color window 21. At least close to the target color window 21 the curve 15 of the first OLED and the curve 14 of the second OLED have substantially the same slope, which may be approximated by a linear function as indicated by the dashed lines 22 and 23. The two curves 14 and 15 of the two OLEDs show therefore a similar behavior at least close to the target color window 21.

Figure 5:
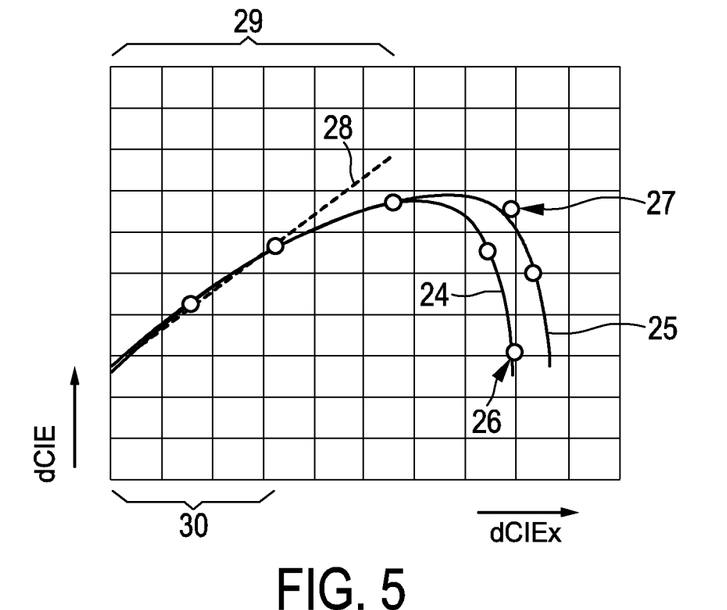
FIG. 5 shows schematically and exemplarily color point shifts for different operational driving currents applied to different OLEDs.

FIG. 4 shows absolute color points for different driving currents, whereas FIG. 5 shows exemplarily relative color points being the difference between a first color point measured, while the respective OLED is driven by a certain driving current, and a second color point measured while the respective OLED is driven by the nominal driving current. The second color point is therefore the nominal color. In FIG. 5, the curve 25 indicates different relative color points for different driving currents for the first OLED and the curve 24 indicates different relative color points for different driving currents for the second OLED. The circles 26 and 27 on the curves 24 and 25 indicate certain relative color points of the respective first and second OLEDs. As can be seen in FIG. 5, in a first region 29 the relative color curves 24 and 25 are the same. Moreover, in a second region 30 both curves can be linearly approximated. The part of the relative color curves within the first region 29 and the linear approximation in the second region 30 can be regarded as color shift functions, which can be provided by the light characteristic shift function providing unit 6.

Figure 6:
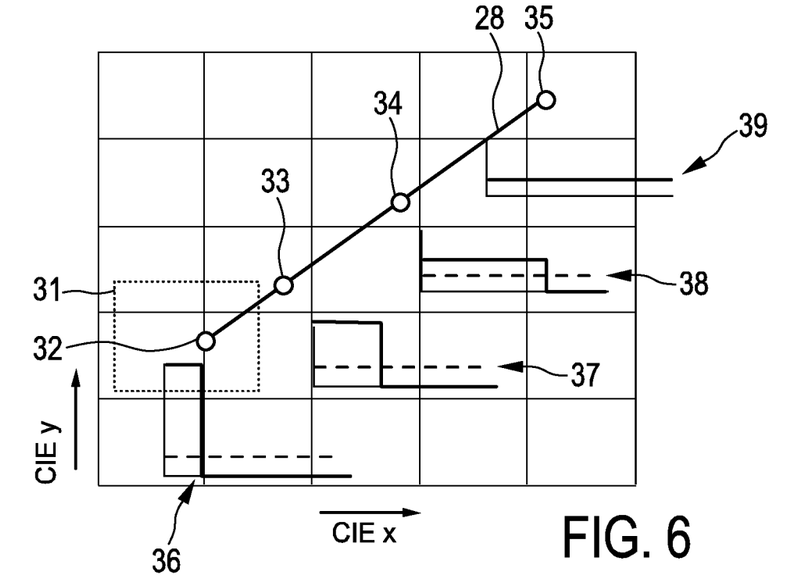
FIG. 6 shows schematically and exemplarily a color shift function defining a color shift depending on an operational driving current applied to an OLED.

FIG. 6 shows exemplarily the linear approximation 28, which can be regarded as being the color shift function. On the linear approximation 28 several relative color points 32 ... 35 are shown, wherein the first relative color point 35 corresponds to a nominal current 39 being a nominal DC driving current. The second relative color point 34 corresponds to a driving current 38 being a square-wave current with a certain amplitude and a certain average current value indicated by the dashed line. The further relative color points 33, 32 correspond to square-wave driving currents 37 and 36, respectively, having larger amplitudes and smaller pulse widths than the square-wave driving current 38. The different square-wave driving currents 36, 37 and 38 exemplarily shown in FIG. 6 have the same average current as indicated by the respective dashed line. The target color window is indicated in FIG. 6 by the rectangle 31.

Figure 7:
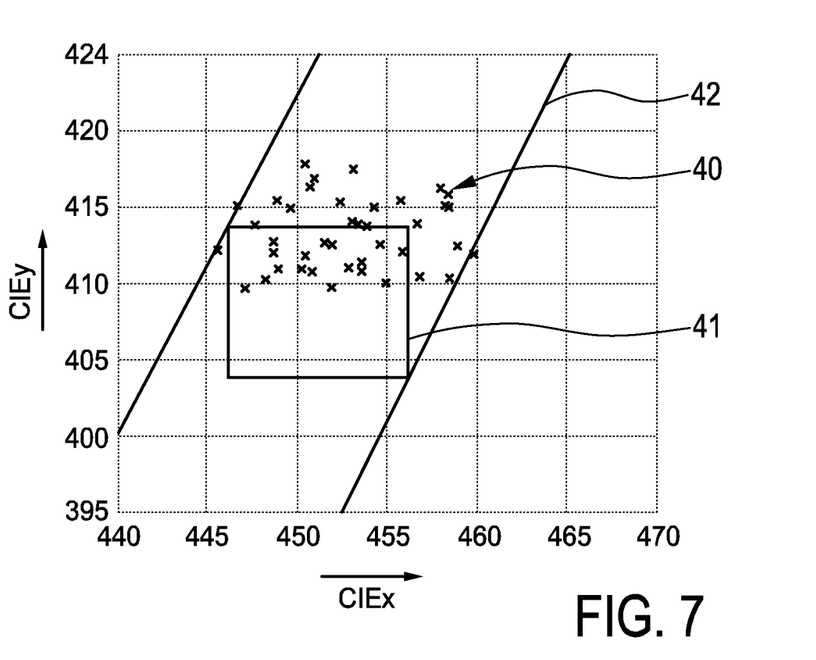
FIG. 7 shows schematically and exemplarily several nominal color points of several OLEDs, to which the same nominal operational driving current is applied.

FIG. 7 shows exemplarily a nominal color point cloud indicating the color points of a group of OLEDs, which are of the same type, for example, which correspond to the same production batch, but which are nevertheless not completely located within the target window 41. The nominal color points 40 shown in FIG. 7 correspond to a nominal DC driving current applied to the respective OLED. The color shift function is the same for each of the OLEDs and is, in this example, a linear function having a slope as defined by the slope of the corridor 42. Thus, each of the color points 40 shown in FIG. 7 can be shifted along a line being parallel to the edges of the corridor 42 such that the respective shifted color point is within the target window 41. In other words, all color points within the corridor 42 can be shifted into the target window 41. Color points outside of or on the edges of the corridor 42 cannot be shifted into the target window 41.

Figure 8:
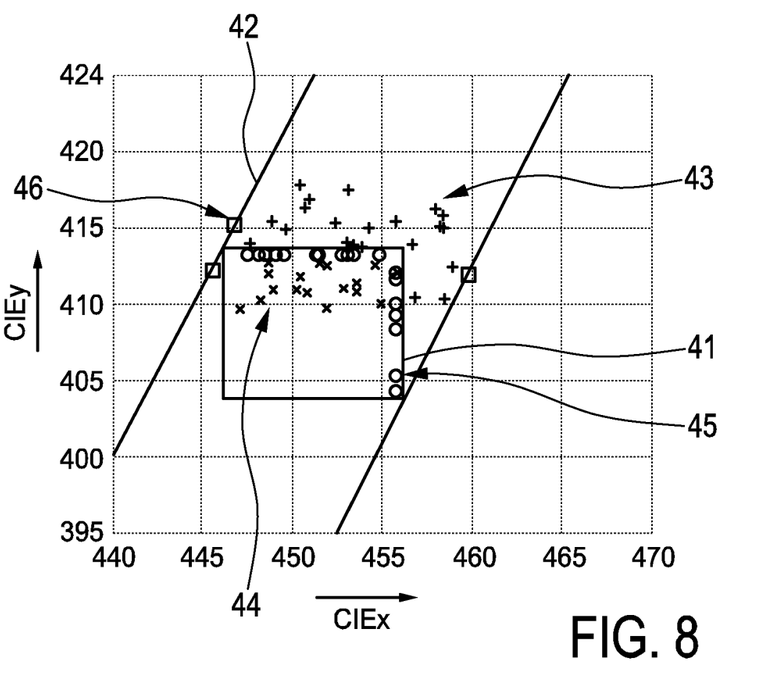
FIG. 8 shows schematically and exemplarily color points of several OLEDs, after an operational driving current has been determined and applied to OLEDs having nominal color points outside of a target window such that the color points of these OLEDs are shifted into the target window.

In FIG. 8, a situation is shown in which color points, which were initially outside the target window 41, have been shifted into the target window 41. In FIG. 8, the former color points before being shifted into the target color window 41 are indicated by a first kind of crosses 43, i.e. by plus signs, and the corresponding shifted color points adjacent to the edges of the target window 41 are indicated by circles 45. A second kind of crosses 44 within the target window 41 indicates the color points, which were already located within the target window 41 and which have therefore not been shifted. The squares 46 are located on the edges of the corridor 42 and the corresponding color points could therefore not be shifted into the target window 41. Thus, the OLEDs corresponding to the crosses 44 within the target window 41 are driven by the nominal DC driving current and the OLEDs corresponding to the circles 45 within the target window 41 are driven by a square-wave driving current having an amplitude and a pulse width, i.e. a duty cycle, as determined depending on the respective nominal color, the target color window and the color shift function by the current determination unit 9. Thus, for each of the OLEDs, which correspond to the circles 45 within the target color window 41, an amplitude and optionally also a pulse width of a square-wave driving current have been determined based on the provided color shift function such that the color point is shifted from the nominal color point to the respective color point within the target window 41 indicated by the respective circle. The circles 45 are located adjacent to the edges of the target color window 41 and not to a more central region within the target color window 41, because a shift to a location adjacent to an edge of the target color window 41 can lead to a smallest current needed for shifting the respective color point into the target color window 41.

The current determination unit can be adapted to determine the driving current, i.e. the operational driving current, not only by considering the color shift function, but also by considering a luminance shift function, wherein the operational driving current can be determined such that the shifted color point is within a target color window and the shifted luminance is within a target luminance window.

Due to the fact that only the "distance" from the respective target window is minimized by shifting along an a priori known characteristic the correction function can be programmatically fixed into the current determination apparatus. This enables an easy method to compensate for color variations and optionally for luminance variations of individual OLEDs without time consuming and therefore expensive calibration procedures.

The shift functions, the target windows and/or driver characteristics, which define dependencies between control signals provided by the current determination apparatus to the respective driving units, can be fixed and stored, for example, in the current determination apparatus or they can be variable, wherein a person can set desired parameters. If the parameters are stored in the current determination apparatus, this can be achieved, for example, during production or later during a programming step, where a programming interface is used to transfer the parameters to one or several respective storing units within the current determination apparatus. If the parameters can be set by a user, an external controller signal, i.e. a signal of an external controller, which is connected to the current determination apparatus, can be used for selecting between different sets of parameters that have been stored previously in a storing unit within the current determination apparatus. The external controller is, for example, a pontiometer or a switch that is connected to the current determination apparatus. The current determination apparatus can be adapted to check the position of the pontiometer or of the switch, wherein the current determination apparatus uses the set of parameters, which corresponds to the actual position of the pontiometer or switch.

The current determination apparatus 2 can be connected with different light sources, which are individually driven by individual driving units, wherein for each light source individual control signals are generated by the current determination apparatus 2 for defining the amplitude and the pulse width, i.e. the duty cycle, of the square-wave operational driving current. In another embodiment, for each light source an individual control unit, in particular, an individual current determination apparatus, can be provided for generating the respective control signals. The one or several control units can be microcontrollers.

In an embodiment, the shift luminance function can be independent of the amplitude of the square-wave operational driving current, but dependent on the average of the square-wave operational driving current. In this case, in a first step the average operational driving current can be determined for each light source, of which the nominal luminance is not within a target luminance window, such that the luminance is shifted into the target luminance window. In a second step, the current determination unit can then determine the amplitude and the pulse width of each light source, of which the color point and/or the luminance has to be shifted, such that the color point is shifted from the nominal color point to a color point within the target color window, if the nominal color point is not already located within the target color window, wherein the average of the operational driving current is held constant as determined in the first step. This determination of the amplitude and the pulse width of the square-wave operational driving current in the second step is based on the color shift function, which is the same for all light sources of the same group.

Although in the above described embodiments the operational driving current is a nominal DC current, if the nominal color point and optionally also the nominal luminance are already within the target color window and optionally within the target luminance window, or the operational driving current is a square-wave operational driving current, if the color point of the respective light source and optionally the luminance of the respective light source have to be shifted into the target color window and optionally into the target luminance window, the operational driving current can also have another shape, for example, it can be sinusoidal.

Although in the above described embodiments the current determination apparatus is described as generating control signals, which are provided to a driving unit for driving the respective light sources, the current determination apparatus, in particular, the control unit, can also be adapted to directly generate a corresponding operational driving current, which is applied to the respective light source.

Although in the above described embodiments the current determination apparatus is adapted to generate several individual control signals for several individual light sources of a group of light sources, the current determination apparatus can also be adapted to generate control signals or directly operational driving currents for a single light source.

Although in the above described embodiments the light sources are OLEDs, the light sources can also be other light sources, which change their color and/or their luminance depending on changes of a driving current for driving the light sources. For example, the light sources can also be light emitting diodes not being OLEDs.

Although in the above described embodiments the operational driving current is a square-wave current, in other embodiments the operational driving current can also have another current shape. For example, the operational driving current can be a trapezoidal current. Moreover, if the operational current is a square-wave current, the current can alternate between zero and a peak current as described above, or the current can alternate between a first non-zero lower current and a second larger current. If the operational driving current has a trapezoidal shape, the shape parameters are, for instance, the peak current value of the trapezoidal shape and the absolute value of the slope of the rising and falling edges, wherein it is assumed that the rising edge and the falling edge have the same absolute slope. If the operational driving current is a square-wave current alternating between two non-zero current values, shape parameters can be the two non-zero current values and the pulse width.

Although in the above described embodiments the current determination apparatus comprises a control unit for controlling the light sources of the group of light sources in accordance with the determined operational driving current, in other embodiments the control unit and the current determination apparatus can be separate devices. For instance, the current determination apparatus can be a separate device, which may be used at the production site only for determining the operational driving currents, wherein current data representing the determined operational driving currents, in particular, the determined operational driving currents themselves and/or control signals for controlling one or several driving units for driving the light sources in accordance with the determined operational driving currents, can be stored in the control unit. A current determination apparatus and a control unit, which are separate, but interconnected devices, can also be used at a user site, wherein the operational driving current can be determined at the user site and used by the control unit for controlling the light sources.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the function of several items recited in the claims. The mere fact that certain measures are recited in mutually different dependent claims does not indicate that a combination of these measures cannot be used to advantage.

Determinations like the determination of the operational driving current and the control of the one or several light sources performed by one or several units or devices can be performed by any other number of units or devices. The determinations and/or the control of one or several light sources of a group of light sources, in particular, of a lighting apparatus comprising the group of light sources, in accordance with the current determination method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a current determination apparatus for determining an operational driving current for driving a light source of a group of light sources. A same color shift function defining a light color shift depending on a driving current can be provided for all light sources of the group. An operational driving current is determined based on the color shift function such that the light color of the light source of the group of light sources is shifted from a nominal color, which may be specific for each light source, to a light color within a target color window. Since for the different light sources the same color shift function can be used, a determination of individual operational driving currents such that the light sources of the group emit light having substantially the same color can be simplified.

The invention claimed is:

1. A current determination apparatus for determining an operational driving current for driving a light source of a group of light sources, the light sources being adapted to change a color of light emitted by the light sources depending on a change of a driving current used for driving the respective light source, the current determination apparatus comprising:

a light characteristic shift function providing unit for providing a color shift function defining a shift of the color of light emitted by a light source of the group of light sources depending on the driving current of the light source, the color shift function being the same for all light sources of the group, a target window providing unit for providing a target color window, a nominal light characteristic providing unit for providing a nominal color of the light emitted by a light source of the group of light sources, if the light source is driven by a nominal driving current, a current determination unit for determining an operational driving current based on the color shift function, the target color window and the nominal color such that the color of the light emitted by the light source of the group of light sources is shifted from the nominal color to a color within the target color window.

2. The current determination apparatus as defined in claim 1, wherein the current determination unit is adapted to determine a modulated current having a current shape as the operational driving current, the light characteristic shift function providing unit is adapted to provide a color shift function defining the color shift depending on the current shape, the current determination unit is adapted to determine a current shape of the operational driving current based on the color shift function, the target color window and the nominal color such that the color of the light emitted by the light source is within the target color window.

3. The current determination apparatus as defined in claim 1, wherein the current determination unit is adapted to determine a modulated current as the operational driving current, the light characteristic shift function providing unit is adapted to provide a color shift function defining the color shift depending on an amplitude of the operational driving current, the current determination unit is adapted to determine an amplitude of the operational driving current based on the color shift function, the target color window and the nominal color such that the color of the light emitted by the light source is within the target color window.

4. The current determination apparatus as defined in claim 3, wherein the light characteristic shift function providing unit is adapted to provide a color shift function defining the color shift depending on an amplitude and a pulse width of the operational driving current, the current determination unit is adapted to determine an amplitude and a pulse width of the operational driving current based on the color shift function, the target color window and the nominal color such that the color of the light emitted by the light source is within the target color window.

5. The current determination apparatus as defined in claim 3, wherein the current determination unit is adapted to determine the pulse width such that the average operational driving current is within a provided target average driving current window.

6. The current determination apparatus as defined in claim 1, wherein the light characteristic shift function providing unit is adapted to provide a luminance shift function defining a shift of the luminance of light emitted by a light source of the group of light sources depending on the driving current of the light source, the luminance shift function being the same for all light sources of the group, the target window providing unit is adapted to provide a target luminance window, the nominal light characteristic providing unit is adapted to provide a nominal luminance of the light emitted by the light source, if the light source is driven by a nominal driving current, the current determination unit is adapted to determine an operational driving current based on the color shift function, the luminance shift function, the target color window, the target luminance window, the nominal color and the nominal luminance such that the color of the light emitted by the light source is shifted from the nominal color to a color within the target color window and such that the luminance of the light source is shifted from the nominal luminance to a luminance within the target luminance window.

7. The current determination apparatus as defined in claim 6, wherein the current determination unit is adapted to determine a modulated current as the operational driving current, the light characteristic shift function providing unit is adapted to provide a luminance shift function defining the luminance shift depending on a pulse-width of the operational driving current, the current determination unit is adapted to determine a pulse-width of the operational driving current based on the luminance shift function, the target luminance window and the nominal luminance such that the luminance of the light emitted by the light source is within the target luminance window.

8. The current determination apparatus as defined in claim 7, wherein the light characteristic shift function providing unit is adapted to provide a luminance shift function defining the luminance shift depending on an amplitude and a pulse width of the operational driving current, the current determination unit is adapted to determine an amplitude and a pulse width of the operational driving current based on the luminance shift function, the target luminance window and the nominal luminance such that the luminance of the light emitted by the light source is within the target luminance window.

9. The current determination apparatus as defined in claim 1, wherein the group of light sources comprises light sources having at least one of the same architecture, the same form and the same size.

10. The current determination apparatus as defined in claim 1, wherein the current determination unit is adapted to determine a modulated current as the operational driving current and the light characteristic shift function providing unit is adapted to provide a color shift function that depends linearly on an amplitude of the driving current.

11. The current determination apparatus as defined in claim 1, wherein the current determination unit is adapted to determine the operational driving current such that the color of the light source is located on or close to an edge of the target color window.

12. The current determination apparatus as defined in claim 1, wherein the light sources are light emitting diodes.

13. A lighting apparatus comprising:

a group of light sources, the light sources being adapted to change a color of light emitted by the light sources depending on a change of a driving current used for driving the light sources, and a current determination apparatus for determining operational driving currents for driving the group of light sources as defined in claim 1.

14. A current determination method for determining an operational driving current for driving a light source of a group of light sources, the light sources being adapted to change a color of light emitted by the light sources depending on a change of a driving current used for driving the light sources, the current determination method comprising:

provided a color shift function defining a shift of the color of light emitted by a light source of the group of light sources depending on the driving current of the light source by a light characteristic shift function providing unit, the color shift function being the same for all light sources of the group, providing a target color window by a target window providing unit, providing a nominal color of the light emitted by a light source of the group of light sources, if the light source is driven by a nominal driving current, by a nominal light characteristic providing unit, determining an operational driving current based on the color shift function, the target color window and the nominal color such that the color of the light emitted by the light source of the group of light sources is shifted from the nominal color to a color within the target color window by a current determination unit.

15. A current determination computer program for determining an operational driving current for driving a light source of a group of light sources, the light sources being adapted to change a color of light emitted by the light sources depending on a change of a driving current used for driving the light sources, the current determination computer program comprising program when executed on a computer causes the computer to carry out the steps of:

providing a color shift function defining a shift of the color of light emitting by a light source of the group of light sources depending on the driving current of the light source by a light characteristic shift function providing unit, the color shift function being the same for all light sources of the group, providing a target color window by a target window providing unit, providing a nominal color of the light emitting by a light source of the group of light sources, if the light source is driven by a nominal driving current, by a nominal light characteristic providing unit, determining an operational driving current based on the color shift function, the target color window and the nominal color such that the color of the light emitted by the light source of the group of light sources is shifted from the nominal color to a color within the target color window by a current determination unit.

\* \* \* \* \*